Figure 1:
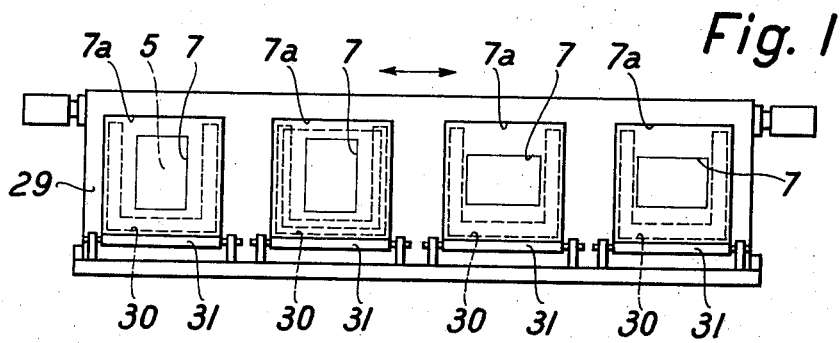

Sept. 27, 1960    L. LEITZ ET AL    2,953,966
SLIDE CHANGER FOR PICTURE PROJECTION APPARATUS
Original Filed June 21, 1955    2 Sheets-Sheet 1

INVENTORS
Ludwig Leitz
Hans Muldt
BY

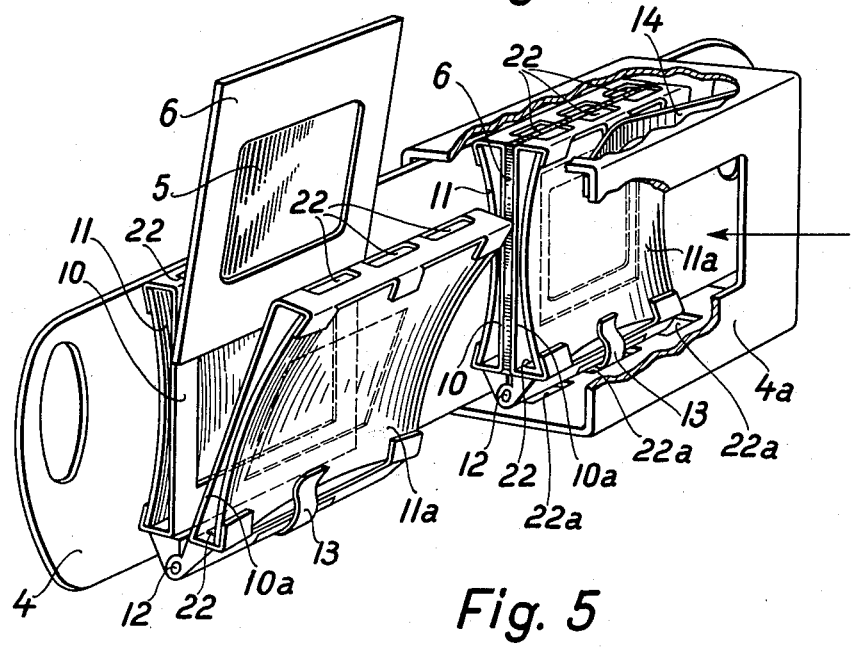
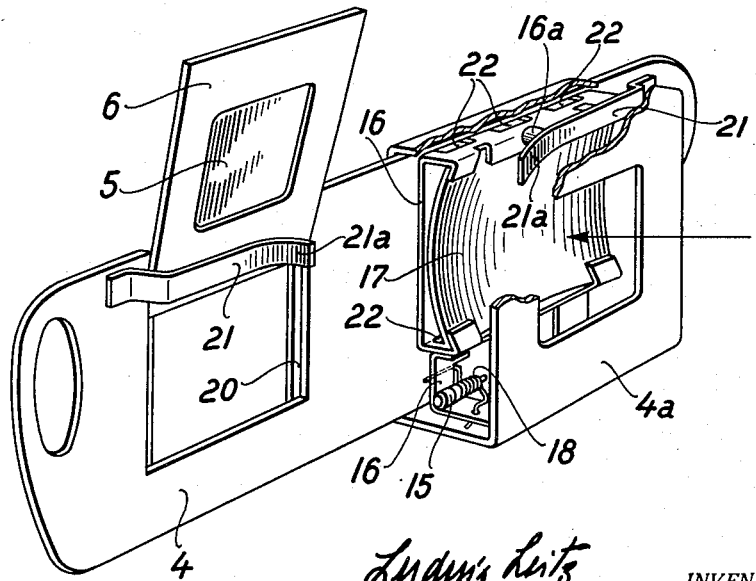

United States Patent Office 2,953,966
Patented Sept. 27, 1960

2,953,966
SLIDE CHANGER FOR PICTURE PROJECTION APPARATUS

Ludwig Leitz and Hans Mulch, both of Wetzlar (Lahn), Germany, assignors to Ernst Leitz, G.m.b.H., a corporation of Germany Original application June 21, 1955, Ser. No. 516,946. Divided and this application Feb. 19, 1958, Ser. No. 716,107

2 Claims. (Cl. 88—28)

This invention relates to improvements in slide changing arrangements in picture projection apparatus and this application is a division of our copending United States patent application Serial Number 516,946, filed June 21, 1955.

This invention has for its object to provide a slide picture changer with pressure plates adapted to protect and support films for projection purposes. Such films are unglazed rigidly framed film diapositives held in projection position by at least one transparent pressure plate of the projection apparatus. The pressure plate extends through the film opening in the rigid film frame and contacts the film. The above cited application discloses a projection apparatus with such film contacting pressure plates.

The slide picture changer operates in a known manner interposed between the lamp and the objective of the projection apparatus and such known arrangement is not illustrated in this application.

The slide picture changer according to this application includes at least one pressure plate, a portion of which is arranged to extend through the film opening in the rigid film frame to contact the film in its position to be projected. The pressure plate engages the film and the plate may be plane or curved.

The use of such pressure plates in a slide changer projection apparatus requires certain definite arrangements in order to obtain uninterrupted changing of the pictures. Thus, that part of a slide picture changer, which is inserted and which remains within the range of the projection light beam, may be provided with at least one pressure plate swingably supported against the pressure of a spring device, or each diapositive holder in the slide picture changer may be provided with its own pressure plate with a spring device.

If a picture changer is used the pressure plates of which remains in the beam of the projector light, then the pressure plates are provided with a lighting spring while the picture changer is provided with spring means which, in the projection position, act upon the pressure plates and serve as a pressure element to bring the pressure plates in touch with the film.

In order to project a picture which has its main axis arranged either vertically or horizontally picture changers provided with corresponding diapositive holders and pressure plates may be used, or the diapositive holders with its pressure plate may be arranged rotatably about its own optical axis onto a picture changer of either type.

The accompanying drawings illustrate two types of picture changers.

Figure 2:
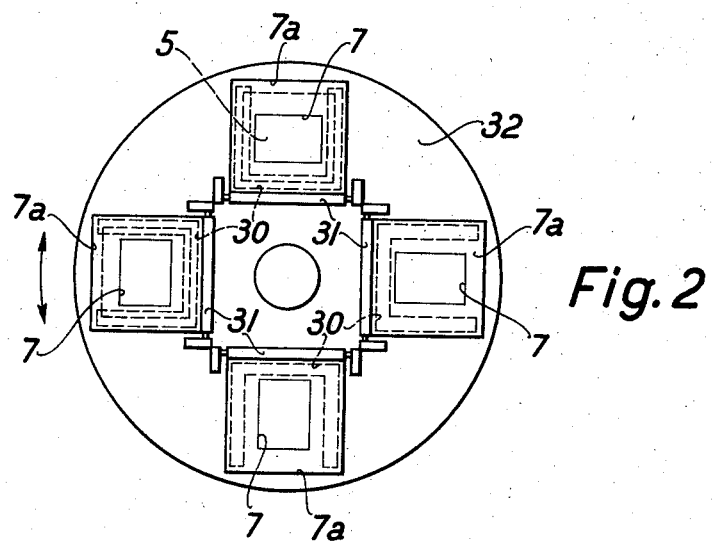

Figs. 1, 3, 4 and 5 illustrate a changer of the slide type. Fig. 2 shows a changer of the turret or rotatable type.

Figure 3:
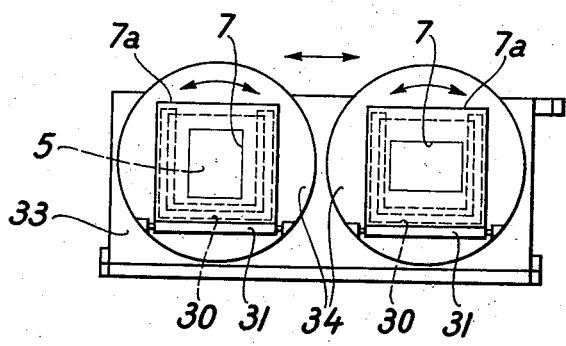

The film 5 is framed in a rigid frame 6 without glass covers. At least one pressure plate 7 is provided with its frame 7a. Figs. 4 and 5 show the film 5 within its rigid frame 6 and pressure plates, which are bent spherical. Figs. 1, 2 and 3 show picture changers provided with pressure plates 7 having rectangular portions arranged to extend through the film opening in the rigid film frame to contact the film of an inserted diapositive in its position to be projected.

Fig. 1 shows a slidable picture changer 29 provided with diapositive holding devices 30 and pressure plates 7 in their frames 7a arranged in pairs for both vertical and horizontal pictures. The pressure plates are pivotally supported by axis 31. Fig. 2 shows the same arrangement to be used when the picture changer 32 is of the rotatable type. In these embodiments rectangular parts of the pressure plates 7 extending through the film opening in the rigid film frame are provided. Thereby, separate holding and pressuring devices are necessary for both vertical and horizontal pictures to be shown.

Fig. 3 shows a slidable changer 33 provided with means for exhibiting two diapositives with pressure plates 7 in frames 7a. Each diapositive is supported in the slidable picture changer 33 by means of holders 30. The pressure plates in this embodiment and also in the embodiments according to Figs. 1 and 2 may be provided at 31 so as to be swingably moved away from the diapositives. The arrangement in Fig. 3 permits both vertical and horizontal pictures to be shown. For this purpose the holders 30, the pressure plates 7 with its frames 7a and its pivots 31 are supported by plates 34, which are rotatably arranged onto the slide 33 of the picture changer.

Fig. 4 shows a slidable picture changer 4 of per se known type which is provided with two devices for supporting film diapositives 5 framed as at 6. The picture changer 4 has a housing 4a which in known manner is supported in the projector, the optical axis of which is indicated by an arrow. The diapositives 5 in their rigid frames 6 are held in the picture changer between two pressure plates, one plate on each side of the film. On one side the pressure plate 11 is carried by a fixed frame member 10. On the other side the movable pressure plate 11a is carried by a swingable frame member 10a, the latter being pivoted on the changer 4 at the point 12. A spring 13 holds the movable pressure plate 11a in contact with the frame member 10a. Both pressure plates 11, 11a are bent spherical. Thereby, only one pair of diapositive holders with pressure plates 11, 11a is necessary for both vertical and horizontal pictures to be shown.

In operation, a film diapositive 5—6 is placed between the pressure plates 11 and 11a, the latter being moved back on the pivot 12. Thereafter the two pressure plates hold the film between them and the spring 13 holds the plate 11a closed upon the other plate. The picture changer 4 within its guiding housing 4a is moved into projection position and a spring 14 then acts to increase the action of the spring 13 and to keep the pressure plate 11a in contact with the film and also keeps the plate 11a and the film 5 in resilient contact with the fixed pressure plate 11 and all together inclusive the slide 4 in a fixed projection position. Thus the film 5 in its frame 6 is supported on both sides and movement of the film caused by temperature changes is prevented. The pressure plate 11 may be omitted and the film held on only one side.

Fig. 5 shows an embodiment of this invention in which only one spherical curved pressure plate 17 is held in a swingable holder 16 pivoted at 15 in the picture changer housing 4a. The holder 16 has a button 16a located on the same side of the housing 4a as the projection lamp, the button being within the housing. A weak spring 15 tends to move the holder 16 with the pressure plate 17 backwards away from the changer 4. The latter has grooves 20 for receiving the diapositives 5—6, which are held in position by springs 21 having a curved end 21a.

When a diapositive 5 is moved by means of the picture changer 4 into position for projection, as shown to the right in the drawing, the curved end 21a of the spring 21 engages behind the button 16a on the swingable holder 16 and pressures the latter with the pressure plate 17 against the diapositive and the diapositive together with the changer 4 against the changer guide into the housing 4a. The diapositive is thus held by resilient means acting against the pressure plate. That is, the plate is held by spring pressure against the film.

When the diapositive is moved away from the projection position, by moving the changer 4 to the right in the drawing, the spring 21 lets go off the button 16a and the weak spring 15 causes the holder 16 with the plate 17 to move backwards away from the changer 4 and thereby leaves them for inserting the next diapositive 5 to be moved into projection position. At the same time, a diapositive inserted into the holding means 20, 21 of the changer, as shown to the left of the drawing, is moved into projection position and there held in the same manner as described before. The housing and the picture changer may be rotated about the optical projecting axis for placing either vertical or horizontal pictures in proper projection position.

A current of cooling air may by known means be directed against the free side of the film. If pressure plates of the same thickness and evenly curved are used, the cooling air stream may be directed against both sides of the film. For this purpose openings as at 22 may be provided in the pressure plate holders 10, 10a and 16 as shown in Figs. 4 and 5. The openings may be in the form of slits which—in projection position—are alined with similar slits 22a in the housing 4a. The cooling air will then be directed past the surface of the film on both sides or only on one side as may be arranged.

We claim:

1. In a picture projection apparatus, a slide changer, a guiding housing for said slide changer, means on said slide changer for supporting thereon framed film-diapositives for projection in said apparatus, said means having at least one axially fixed and one axially movable holding means for supporting framed diapositives inserted to be held between said holding means, means for supporting said holding means on said slide changer, spring means engaging said axially movable holding means to maintain resilient contact intermediate said fixed and movable holding means and the framed film-diapositives inserted between said holding means, and a transparent pressure plate means connected at least with said axially movable holding means, said pressure plate means having a curved portion adapted to extend through the film opening in the rigid frame and to engage the film portion of the framed film-diapositive inserted in the slide changer to be held between said holding means.

2. A slide changer as claimed in claim 1 wherein the curved portion of said transparent pressure plate means is of substantially spherical configuration.

References Cited in the file of this patent

UNITED STATES PATENTS

| | | |
|---|---|---|
| 2,335,326 | Walter | Nov. 30, 1943 |
| 2,496,008 | Jablon | Jan. 31, 1950 |
| 2,558,982 | Pratt et al. | July 3, 1951 |